United States Patent [19]

Zupancic

[11] Patent Number: 5,062,016
[45] Date of Patent: Oct. 29, 1991

[54] SET OF STRUCTURAL BRACKETS THAT ALLOW ELECTRONIC/ELECTRICAL ASSEMBLIES TO BE MOUNTED WITHIN A COMPUTER ENCLOSURE

[76] Inventor: Derek J. Zupancic, 7143 Owensmouth Ave., Canoga Park, Calif. 91303

[21] Appl. No.: 175,952

[22] PCT Filed: May 5, 1986

[86] PCT No.: PCT/US86/00985
§ 371 Date: Nov. 10, 1987
§ 102(e) Date: Nov. 10, 1987

[87] PCT Pub. No.: WO87/07052
PCT Pub. Date: Nov. 19, 1987

[51] Int. Cl.$^5$ .................. G11B 15/00; G11B 5/012
[52] U.S. Cl. .......................... 360/97.01; 360/98.01
[58] Field of Search .................. 360/97.01, 98.01; 364/708; 361/427

[56] References Cited

U.S. PATENT DOCUMENTS

| | | | |
|---|---|---|---|
| 3,758,828 | 9/1973 | Stefani | 361/427 X |
| 4,479,198 | 10/1984 | Romano | 364/708 X |
| 4,639,863 | 1/1987 | Harrison | 360/98.01 X |

*Primary Examiner*—A. J. Heinz
*Attorney, Agent, or Firm*—Albert O. Cota

[57] ABSTRACT

A method that allows a disk-drive/controller card mounting bracket (12) and a slotted hang bracket (14) to increase the overall power and efficiency of a computer. The bracket (12) is used to mount a 3.5-inch Winchester drive (60) and its controller interface card (50) to form a composite assembly (16). The assembly is then plugged into an existing bus connector, located within a computer enclosure to increase the computer's memory capacity. The bracket (14) allows one or more circuit card assemblies (80) or electrical equipment i.e., a cooling fan or disk drive to be mounted in a cantilever fashion within the computer. The two brackets (12), (14) are designed to increase the computer's power and efficiency by using the existing but limited space within the computer enclosure.

5 Claims, 2 Drawing Sheets

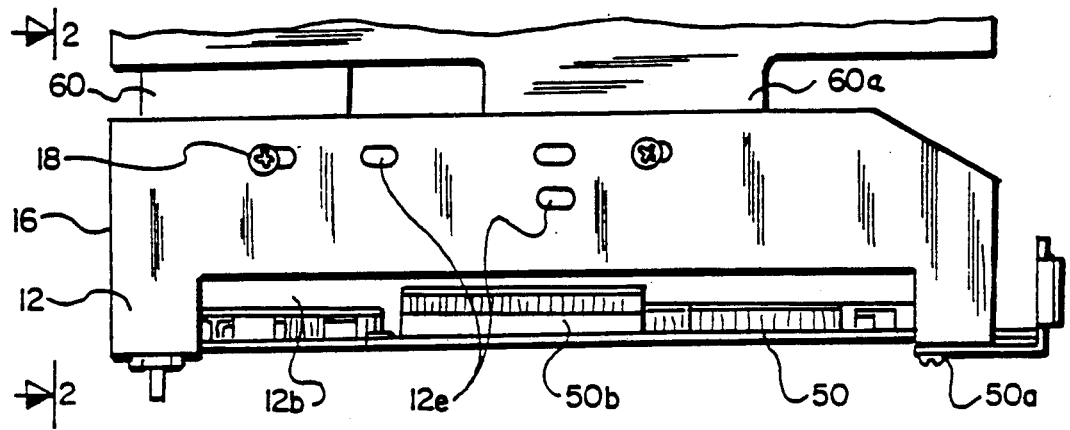
Fig.1.
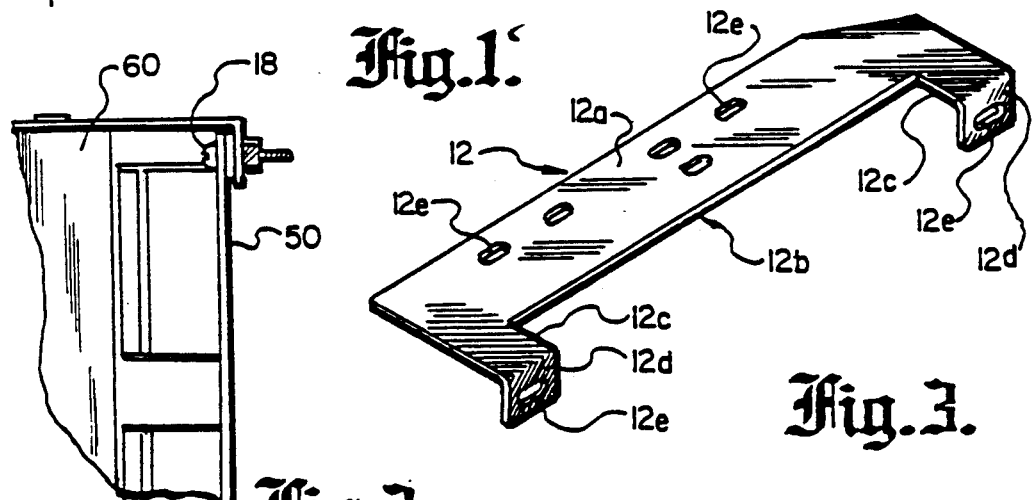
Fig.2.
Fig.3.
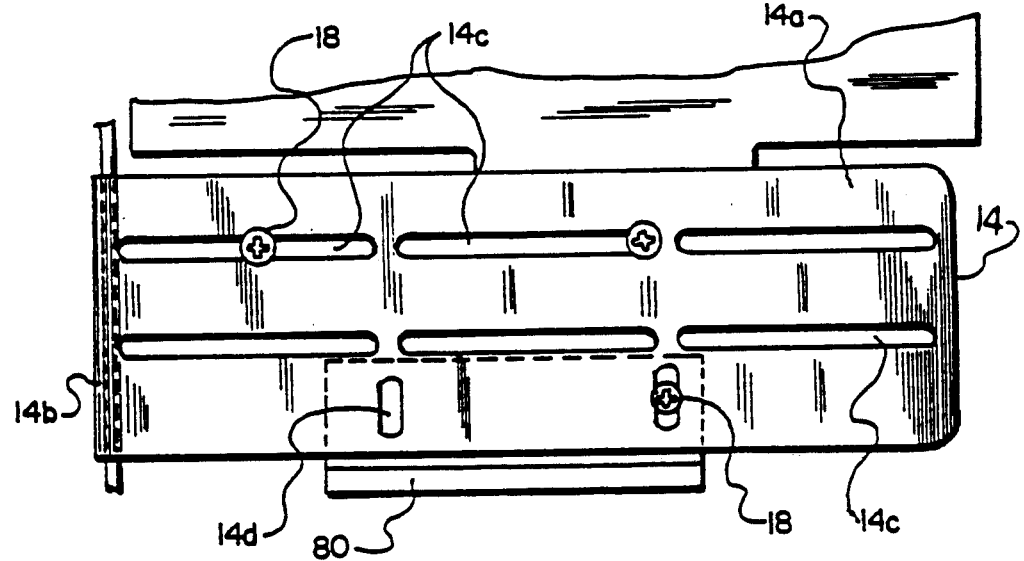
Fig.4.

SET OF STRUCTURAL BRACKETS THAT ALLOW ELECTRONIC/ELECTRICAL ASSEMBLIES TO BE MOUNTED WITHIN A COMPUTER ENCLOSURE

TECHNICAL FIELD

The invention pertains to the general field of structural elements for mounting electronic/electrical assemblies and more particularly to a set of brackets that allow the assemblies to be easily mounted within a computer enclosure.

BACKGROUND ART

From the onset of computer technology, it has been a design goal to create a powerful computer with the least amount of space. In this endeavor, integrated circuitry together with state-of-the-art manufacturing and attachment techniques has considerably reduced the overall packaging space of computers.

To increase the power of a computer in terms of memory capacity and speed, it is necessary to add integrated circuits and/or discrete devices. These devices are usually attached to printed circuit boards. Because of the limited space available in the original design, it is difficult to find space within a computer to add additional boards. Therefore, if an expansion slot is not available or a slot is available but without sufficient room, a separate structure with the required card(s) must be used and connected to the computer by means of an external connector cable.

One of the prime elements that is currently used to increase computer memory capacity is a hard disk drive. These drives are used in combination with a controller card and are typically much larger in terms of bulk than a set of printed circuit boards. Therefore, because of its size, the drive is typically inserted into a dedicated front slot on the computer. The placement of the drive within the computer is difficult in terms of finding space and making electrical connections.

DISCLOSURE OF THE INVENTION

The invention discloses a method that allows a disk-drive/controller card mounting bracket and a slotted hang bracket to substantially increase the power and efficiency of a computer by using the existing but limited space within a computer enclosure.

The disk-drive/controller card mounting bracket is used to create a composite assembly that is comprised of a 3.5-inch Winchester disk drive and its controller interface card. The assembly is then plugged into an existing bus connector that is located within the computer enclosure.

The slotted hang bracket allows a circuit card assembly, disk drive assembly or other electrical equipment, such as a cooling fan, to be mounted within the computer enclosure in a cantilever fashion. The circuit cards can be either mounted on their edge that is, with the edge of the card perpendicular to the bracket's surface or with the plane of the card attached parallel to the bracket's surface. The card configuration selected is dependent on the space available and/or the location of the card.

In view of the above, it is the primary object of the invention to provide a method utilizing the two cards either singularly or together to increase the power and efficiency of a computer, and in particular its memory capacity, by utilizing existing space within a computer.

In addition to the above primary object, it is also an object of the invention to provide a method with associated hardware that:

is cost effective in terms of manufacturing and end usage,
is electronically and mechanically reliable,
is easily maintainable, and
is easy to assemble and install in a computer.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 1 is a bottom plan view of the disk-drive/controller card mounting bracket shown attached to a disk drive and a controller interface card.

FIG. 2 is a cut away side view taken along section 2—2 of FIG. 1.

FIG. 3 is a perspective view of the disk-drive/controller card mounting bracket.

FIG. 4 is a top plan view of the slotted hang bracket.

BEST MODE FOR CARRYING OUT THE INVENTION

Figure 5:
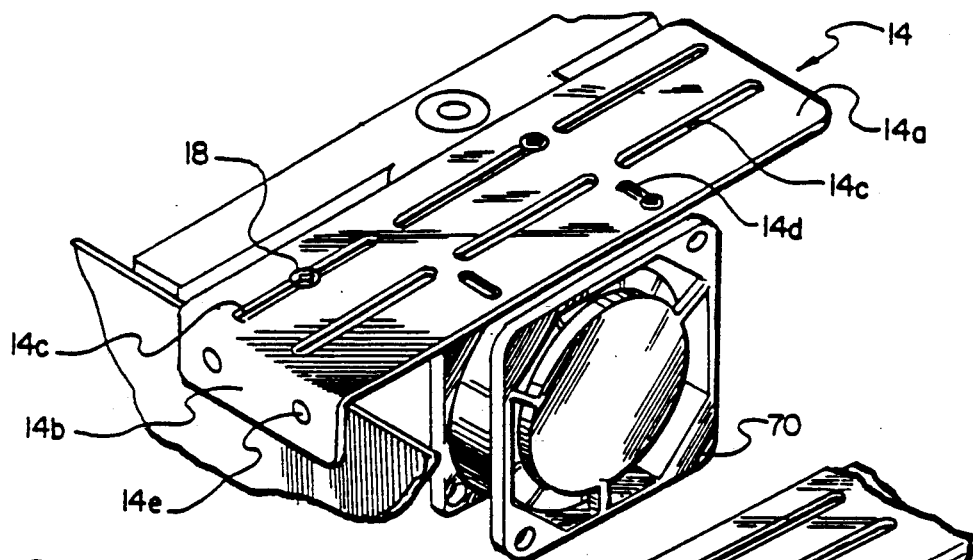
FIG. 5 is a perspective view of a cooling fan attached to the slotted hang bracket and the bracket attached to a wall of a computer enclosure.

The best mode for carrying out the invention is presented in terms of a preferred set of two mounting brackets: a disk drive/controller card mounting bracket 12 and a slotted hang bracket 14. The bracket 12 is primarily designed to allow a 3.5-inch Winchester hard disk and its companion controller card to be integrally attached. The ensuing composite assembly 16 is then mounted into a single expansion slot located inside a computer enclosure; the slotted hang bracket 14 is designed to also allow disk drives and peripheral equipment such as printed circuit board assemblies, cooling fans and other such equipment to also be mounted in a cantilever fashion within a computer enclosure.

The disk drive/controller card mounting bracket 12, as shown best in FIG. 3, is constructed, in the preferred embodiment, of metal such as steel or aluminum and may be either painted or sealed with a chemical process like anodizing. The bracket has an elongated horizontal surface 12a that has an opening 12b on one of its longitudinal sides. The opening 12b is enclosed on each end 12c by a tab 12d that is bent downwardly, normal to the horizontal surface 12a. That is, the tab is vertically oriented with respect to the horizontal surface 12a.

The horizontal surface has a plurality of elongated mounting slots 12e. In the preferred embodiment, the slots are arranged to allow a 3.5 inch disk drive to be attached as described supra. A single slot 12e is also located on the face of each tab 12d.

The disk drive/controller card mounting bracket 12 is specifically designed to create a composite assembly 16, as shown in FIG. 1, that consists of a controller interface card 50 and a 3.5-inch Winchester disk drive 60.

The card 50 is typically a 4-inch by 5.5 inch (10 cm × 14 cm) printed circuit card. However, larger cards may also be used with each card having a male bus connector that extends outwardly along the plane of the card. On each bottom corner of the card end, that is the end where the connector is located, is a mounting hole 50a as shown in FIG. 1.

The 3.5-inch Winchester drive, as typically configured, has a rectangular upper and lower section and two supporting side members. The drive is approximately sized to fit and be juxtaposed along the plane of the card 50.

The composite assembly 16 is designed to be installed on any computer, particularly desk top computers and personal computers. The only restriction imposed on the usage of the assembly 16 is that the computer have an enclosure that incorporates a bus slot or equivalent. To begin constructing the assembly 16, the mounting slots 12e located on the tabs 12d are attached to the respective mounting holes 50a on the card 50. A bottom view of the card attached to the bracket 12 is shown in FIG. 1 and a cutaway view is shown in FIG. 2. When the card is attached, the bus connector 50a extends outwardly from the opening 12b on the bracket 12.

After the card is attached, the lower section 60a of the disk drive 60, as shown in FIG. 1, is attached to the bracket 12 by abutting the lower disk surface against the bracket surface and inserting threaded bolts 18 into two or more of the mounting slots and the corresponding threaded bores on the disk drive 60.

When the composite assembly 16 is completed, one of the side walls of the disk drive 60 is juxtaposed along the same plane of the card 50. The male bus connector 50b on the card 50 is then plugged into the female bus slot on the computer enclosure.

The next element described is the slotted hang bracket 14 that further allows peripheral equipment capacity of a computer to be integrally increased.

The slotted hang bracket 14, as best shown in FIGS. 4 and 5, is constructed of a material and finish treated as described for the bracket 12. The bracket 14 has an elongated horizontal surface 14a and a contiguous tab 14b that is bent downwardly and normal to the horizontal surface 14a. The horizontal surface has a plurality of longitudinally oriented rows with each row having a plurality of longitudinal slots 14c. The horizontal surface also includes a set of second slots 14d that are centered and near the edge of the horizontal surface 14a. Each of these slots 14d is normal to the longitudinal slots 14c.

The slotted hang bracket 14 is designed to integrally hold peripheral equipment units where the unit is attached to one or more of the longitudinal slots 14c and where the tab 14b is attached to a side wall on the computer enclosure.

As shown in FIG. 5, one use of the bracket 14 is to attach a cooling fan 70. In this design, the fan has an upper side that is attached by aligning a set of threaded bores with the respective second slots 14d on the bracket 14. A threaded bolt is then inserted through the slot to hold the fan. The entire assembly is then held in place by placing the tab over one of the computer walls and fastening the tab 14b to the wall by a nut and bolt combination inserted through the slots 14e on the tabs.

Figure 6:
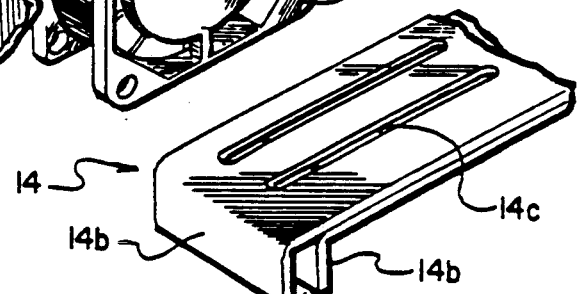
FIG. 6 is a partial perspective view showing the mounting slot created when two brackets are placed one above the other.

A cooling fan 70 or other similar devices may also be mounted askewed on one side of the bracket 14. In this arrangement (not shown) two brackets 14 are placed one above the other to allow a device to be wedged between the two, and to create a mounting slot that is bordered by the two contiguous tabs 14b. The created slot as shown in FIG. 6, is then placed over a computer wall with or without any attachment means.

Figure 7:
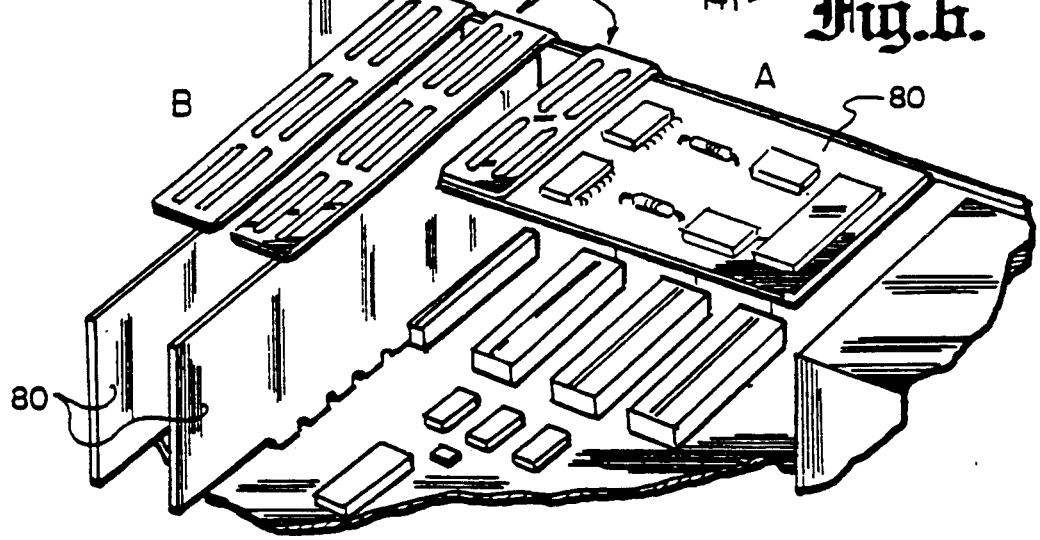
FIG. 7 is a perspective view of a slotted hang bracket shown with edge mounted cards and a surface mounted card.

The slotted hang bracket may also be used to attach a circuit card assembly 80. The cards may be attached to the bracket with the plane of the card parallel with the bracket's horizontal surface as shown in FIG. 7A; or where the edge of the card 80 is perpendicular to the horizontal surface of the bracket as shown in FIG. 7B; in this latter case, L-brackets would be used to attach the card to the bracket.

Although the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the claims. For example, by using two disk drive/controller card mounting brackets 12 in combination with a controller card, two disk drives may be attached to the bracket and computer. A disk-drive/controller card mounting bracket 12 and a slotted hang bracket 14 may also be combined to install a controller card 50 and two separate disk drives 60 within the computer enclosure; or another hard disk 60 may be added via a hang bracket 14. The slotted hang bracket may also be used in several other mounting positions to attach a variety of peripheral equipment.

I claim:

1. A mounting bracket interconnecting a computer peripheral data storage device with a computer interface card having a male bus connector on one end, for direct connection to a computer circuit inside a computer enclosure having at least one female bus expansion slot therein, said mounting bracket comprising:
   a) a generally rectangular frame defining an elongated horizontal surface having an elongated notch formed along one of its longitudinal sides, and at least one tab projecting vertically from said longitudinal side and having a mounting opening formed therethrough, the horizontal surface having a plurality of mounting openings formed therethrough,
   b) means for attaching said computer peripheral data storage device to at least one of said mounting openings of said mounting bracket, and
   c) means for attaching said computer interface card to said mounting bracket with said male bus connector projecting through said elongated notch, whereby said mounting bracket forms a composite assembly interconnecting said computer peripheral data storage device and said computer interface card, and which can be directly connected to said computer circuit by coupling said male bus connector within said female bus expansion slot with said female bus expansion slot projecting into said elongated notch.

2. The mounting bracket as specified in claim 1 wherein said storage device comprises a 3.5 inch Winchester disk drive.

3. The mounting bracket as specified in claim 1 wherein said peripheral equipment comprises a cooling fan.

4. The mounting bracket as specified in claim 1 wherein said peripheral equipment comprises a hard-disk drive.

5. A method for interconnecting a computer peripheral data storage device with a computer interface card having a male bus connector on one end, for direct connection to a computer circuit inside a computer enclosure having at least one female bus expansion slot therein, where said method uses a mounting bracket that is comprised of a generally rectangular frame defining an elongated horizontal surface having an elongated notch formed along one of its longitudinal sides, and at least one tab projecting vertically from said longitudinal side and having a mounting opening formed therethrough, the horizontal surface having a plurality of mounting openings formed therethrough, said method comprising the steps of:

a) attaching said computer peripheral data storage device to at least one of said mounting openings of said mounting bracket, and b) attaching said computer interface card to said mounting bracket with said male bus connector projecting through said elongated notch, whereby said mounting bracket forms a composite assembly interconnecting said computer peripheral data storage device and said computer interface card, and which can be directly connected to said computer circuit by coupling said male bus connector within said female bus expansion slot with said female bus expansion slot projecting into said elongated notch.

* * * * *